Oct. 18, 1932.  J. ZUBATY  1,883,288
VENTILATING APPARATUS FOR DYNAMO ELECTRIC MACHINES
Filed Sept. 26, 1927

Inventor
Joseph Zubaty
By Blackmore, Spencer & Flint
Attorneys

Patented Oct. 18, 1932

1,883,288

UNITED STATES PATENT OFFICE

JOSEPH ZUBATY, OF FLINT, MICHIGAN, ASSIGNOR TO A C SPARK PLUG COMPANY, OF FLINT, MICHIGAN, A COMPANY OF MICHIGAN

VENTILATING APPARATUS FOR DYNAMO-ELECTRIC MACHINES

Application filed September 26, 1927. Serial No. 222,099.

This invention relates to ventilating apparatus for electric motors and similar machines.

It is customary to construct electric motors generators, and similar machines so that air may circulate through the interior of the machine to cool the working parts thereof. When such a machine is exposed to dust-laden air, some of the dust from the air is deposited inside of the machine and may cause short circuits and/or other troubles. In order to prevent introduction of dust-laden air into the machine and the consequent precipitation of dust on the working parts thereof, motors, generators and similar machines have been, in some cases, provided with air tight casings which prevented the entrance of air and consequently dust into the interior of the machines but made the machines dependent entirely on radiation from the outside of the casing for dissipating the heat generated within. In order to properly cool such a machine, it is necessary to make the casing considerably larger than is necessary merely to inclose the working parts in order to provide sufficient radiation surface. In many cases, such a bulky motor is inconvenient if not impractical. In other cases, clean air for a number of motors has been distributed from a central source. This system is cumbersome and expensive and is not always suitable. It is an object of this invention to provide ventilating apparatus for electric motors, generators and similar machines which overcomes the defects of the systems mentioned above.

It is another object of this invention to provide ventilating apparatus for electric motors, generators and similar machines in which the cooling air is cleaned before it is introduced into the interior of the machine.

It is another object of this invention to provide ventilating apparatus for electric motors, generators and similar machines which includes a housing around the casing of the machine wherein the dirt is separated from the air before the latter is introduced into the interior of the machine.

It is another object of the invention to provide a cooling system for electric motors, generators and similar machines wherein the cooling air is drawn both over the outside and through the interior of the machine thereby more efficiently cooling the machine.

It is another object of the invention to provide new and improved air cleaning apparatus.

Figure 1:
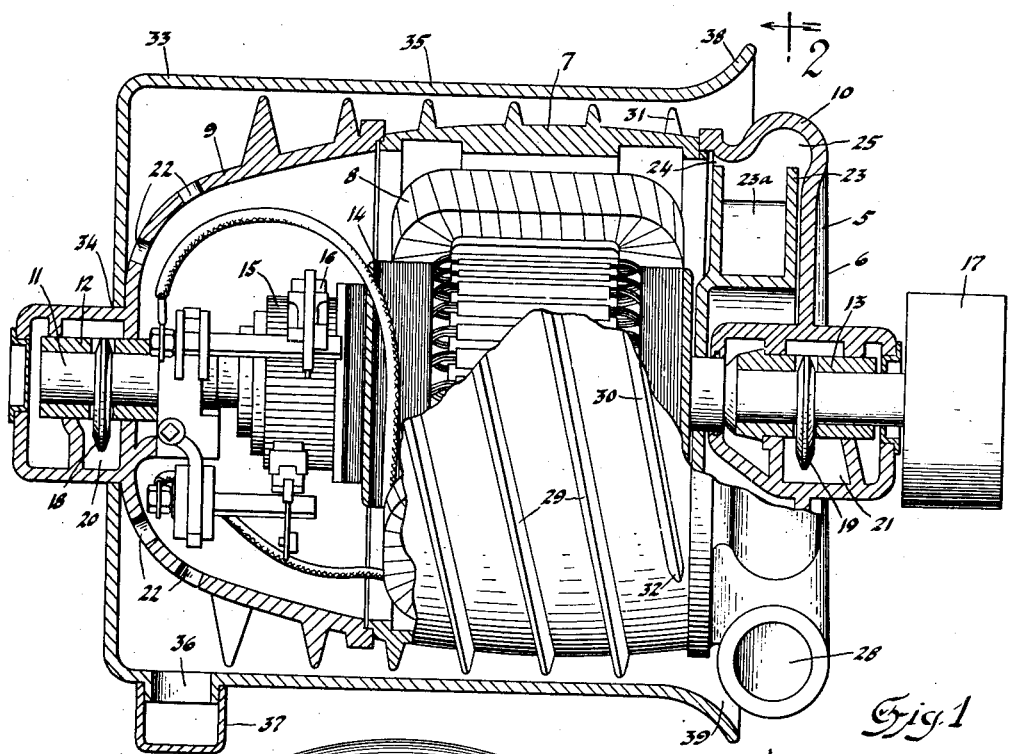
Figure 1 is a view, mainly in longitudinal section, through an electric motor on which is installed ventilating apparatus in which is embodied my invention.
Figure 2:
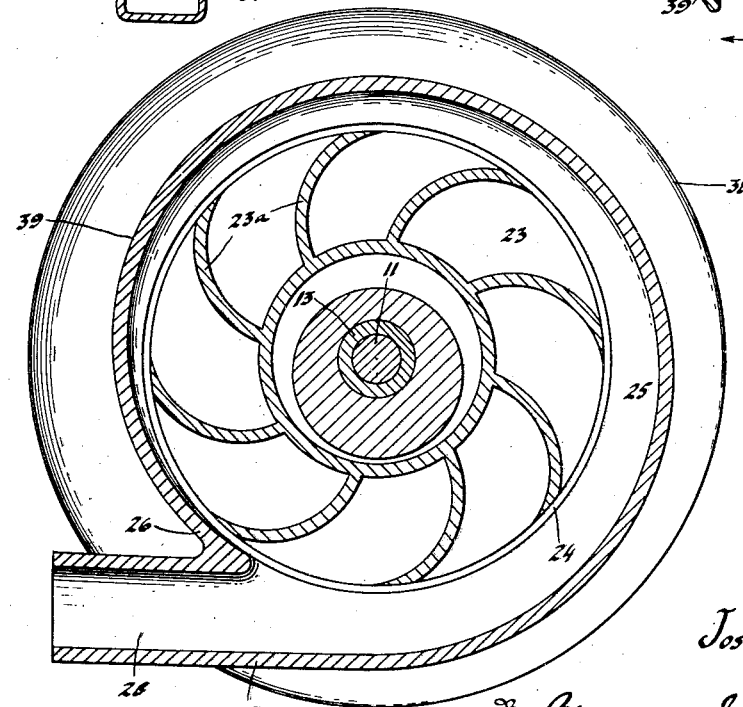
Figure 2 is a section taken on the line 2—2 of Figure 1.

In the drawing the reference character 5 indicates an electric motor provided with a casing 6. The casing is composed of three sections, a central cylindrical section 7, to which the field coils 8 are secured, and two end sections 9 and 10 suitably secured to the opposite ends of the cylindrical section. The shaft 11 is rotatably mounted in bearings 12 and 13 carried by the opposite end sections of the casing, and carries the armature 14 and the commutator 15, with which the brushes 16 contact in the usual manner, within the casing, and on the outside of the casing carries the pulley 17. The bearings 12 and 13 are lubricated by loose rings 18 and 19 in sealed oil reservoirs 20 and 21 in the end sections 9 and 10 of the casing.

As can be seen from the drawing, the casing entirely encloses all of the working parts of the motor and prevents access of dirt thereto. In order to ventilate the interior of the motor, the end section 9 is provided with air inlet openings, such as 22. Adjacent the opposite end of the motor, there is rigidly mounted on the shaft 11 so as to rotate therewith, within the end section 10 of the casing, a centrifugal fan 23, with blades 23a. On the side of the end section 10 adjacent the cylindrical section 7, the fan and the casing are circumferentially spaced, as indicated at 24, to provide an opening for the air to pass from the interior of the motor to the fan. On its outer side, the casing is provided with a circumferential channel 25 which gradually increases in depth from the point 26 to the point 27 where it merges into the tangential discharge conduit 28. It is to be noted that the only openings in the casing are those at 22 through which air enters the interior of the motor and that at 28 where the air is discharged by the fan 23 after passing through the motor.

In order that the air entering the interior of the motor through the openings 22 shall be free from dirt particles, the following arrangement is provided. The outside of the casing is formed with fins 29 and 30, starting at 31 and 32, extending spirally therearound and ending adjacent the openings 22, and a cup-shaped housing 33, preferably a metal stamping, having an opening 34 in its bottom which fits tightly around the oil reservoir 20, surrounds the casing with its side walls 35 in close proximity to the outer edges of the fins. It will be noted that in order to have the outer edges of the fins spaced equally from the housing at all points the fins are increased in depth on the smaller parts of the casing. This same result might also be accomplished by making the fins of constant depth and making the outer surface of the casing and the inner surface of the housing parallel throughout that portion of the casing which carries the fins. In its side wall and adjacent the bottom and the openings 22, the housing is provided with a dirt discharge opening 36 leading into the dirt receptacle 37. The side walls of the housing terminate a slight distance inwardly of the outer wall of the end section 10 of the casing where they are flared outwardly, as indicated at 38, to provide a circumferential opening 39 between the housing and the casing. The housing is made air tight at all necessary points, such as 34 and 36, so that 39 is the only opening by which air may enter between the housing and the casing.

When the motor starts, the fan 23 rotates and air is sucked into the opening 39 between the housing and the casing and from there into the space between the fins 29 and 30 and, being compelled by the fins to circulate around the casing, is given a rotary motion which throws the dirt particles to the outside against the housing and finally through the opening 36 into the dust receptacle 37. The clean air passes through the openings 22 into the interior of the motor, passes over and cools the commutator, brushes, field coils and armature and then passes through the opening 24 into the channel 25 from which the fan 23 forces it through the opening 28 into the atmosphere. The cooling air is thus applied to the motor both externally and internally and therefore cools the motor very efficiently. It is to be noted that the discharge conduit 28 extends beyond the flared out portion of the housing so that the heated air from the interior of the motor will not be returned to the space between the housing and the casing, and thence to the interior of the motor.

Though my ventilating system has been described in connection with an electric motor, it is obvious that it is not limited to such a restricted use. It may equally well be applied to a generator, rotary converter or any machine of this general type and is applicable to both A. C. and D. C. machines.

It is obvious that an air cleaner comprising inner and outer spaced shells with means therebetween to separate the dirt from the air is not limited to the use in which it is shown and described here but is of general application.

I claim:

1. In a device of the class described, a rotatable shaft, a casing surrounding the shaft and spaced therefrom between its ends, a housing surrounding and circumferentially spaced from the casing, the space within the casing being in communication with the space between the casing and the housing and also in communication with the atmosphere, and means associated with said shaft to cause air to pass from the atmosphere into and through the space between the casing and the housing, into and through the space within the casing, and from the space within the casing back into the atmosphere.

2. In a device of the class described, a rotor and a stator, a casing having an opening adjacent each end enclosing both the rotor and the stator, a housing surrounding and circumferentially spaced from the casing and being closed adjacent one end of the casing and open adjacent the other end, a spiral fin in the space between the casing and the housing starting adjacent the open end of the housing and ending adjacent an opening in the casing, a dust receptacle adjacent the last mentioned opening in the casing, and a fan on said rotor within the casing and adjacent the other opening to circulate air through the space between the casing and the housing into the casing and discharge it through the last mentioned opening.

3. As an article of manufacture, a casing for a device of the class described which includes, a cup-shaped end section having an inlet opening therein, a cylindrical central section secured to said end section, and a cup-shaped end section having a tangential discharge opening therein secured to said central section, said first named end section and said central section having a spiral fin on the outer surfaces thereof.

4. In a device of the class described, a rotatable shaft, a casing surrounding a portion of the shaft and spaced therefrom between its ends, a housing surrounding and circumferentially spaced from the casing, the space within the casing being in communication with the space between the casing and the housing and also in communication with the atmosphere, means associated with the shaft to cause air to pass from the atmosphere into and through the space between the casing and the housing into and through the space within the casing and from the space within the casing back into the atmosphere; and means to separate foreign matter from the air before the latter enters the interior of the casing.

5. In a device of the class described, a rotatable shaft, a casing surrounding a portion of the shaft and spaced therefrom between its ends, a housing surrounding and circumferentially spaced from a portion of the casing, the space within the casing being in communication with the space between the casing and the housing and also in communication with the atmosphere, means associated with the shaft to cause air to pass from the atmosphere into and through the space between the casing and the housing into and through the space within the casing and from the space within the casing back into the atmosphere, and means within the housing to effect an inertia separation of foreign matter from the air before the latter enters the interior of the casing.

6. In a device of the class described, a rotatable shaft, a casing surrounding a portion of the shaft and spaced therefrom between its ends, a housing surrounding and circumferentially spaced from the casing, the space within the casing being in communication with the space between the casing and the housing and also in communication with the atmosphere, means associated with the shaft to cause air to pass from the atmosphere into and through the space between the casing and the housing, into and through the space within the casing and from the space within the casing back into the atmosphere, means to cause the air to travel through the housing in a helical path, and an opening through which the dirt thus separated from the air by centrifugal action may be discharged from the housing.

7. In a dynamo-electric machine, a rotor, a stator, a casing having an opening adjacent each end inclosing the rotor and the stator, a housing surrounding and circumferentially spaced from the casing, closed ajacent one end of the casing and open adjacent the other end thereof, a spiral vane in the space between the casing and the housing to effect an inertia separation of foreign matter from air passing through the space between the housing and the casing, a dust discharge opening in the housing at a point distant from its intake end, and a fan on the rotor to circulate air through the space between the casing and the housing into the casing and thence into the atmosphere.

8. In a dynamo-electric machine, a casing which encloses working parts of the machine and in which there are provided adjacent opposite ends air intake and discharge openings, means to cause cooling air to pass over the outside of the casing into the air intake openings, through the interior of the casing and out of the air discharge openings, and means to separate foreign matter from the air during the course of its travel over the outside of the casing.

In testimony whereof I affix my signature.
JOSEPH ZUBATY.